June 27, 1933.  F. M. WALZ ET AL  1,915,505
VEHICLE SIGNAL
Filed Feb. 18, 1931   2 Sheets-Sheet 1
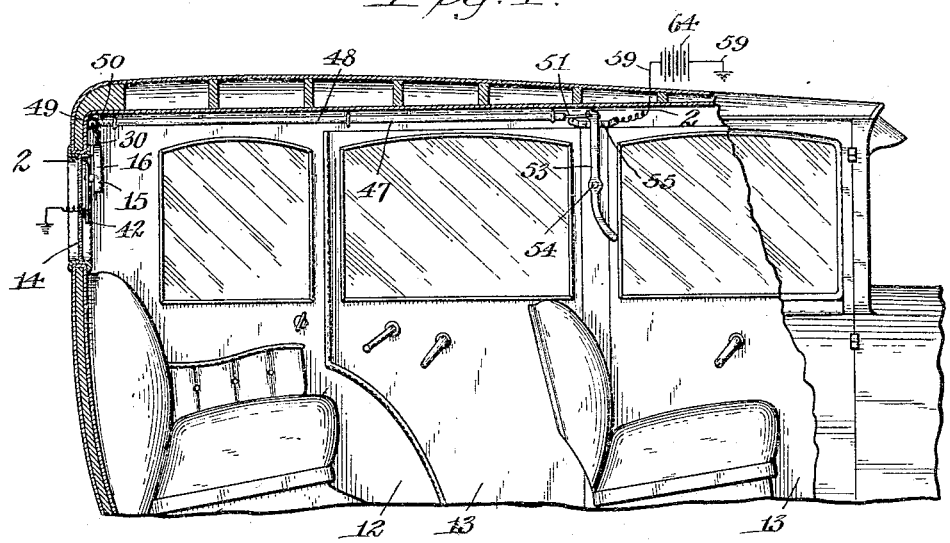
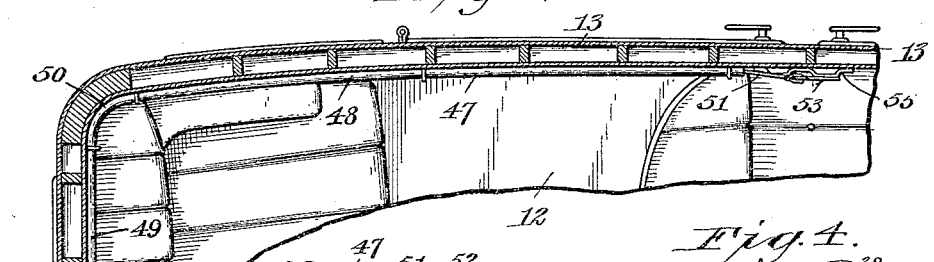
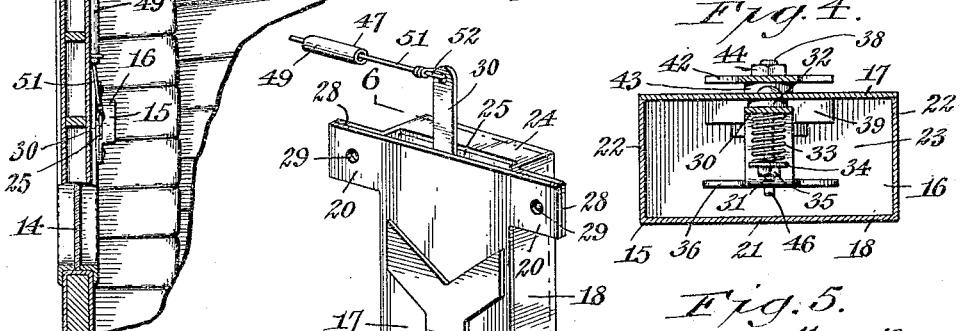
Frederick M. Walz,
Charles J. Walz, Inventors
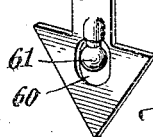
Attorney
Witness:
J. J. Oberst

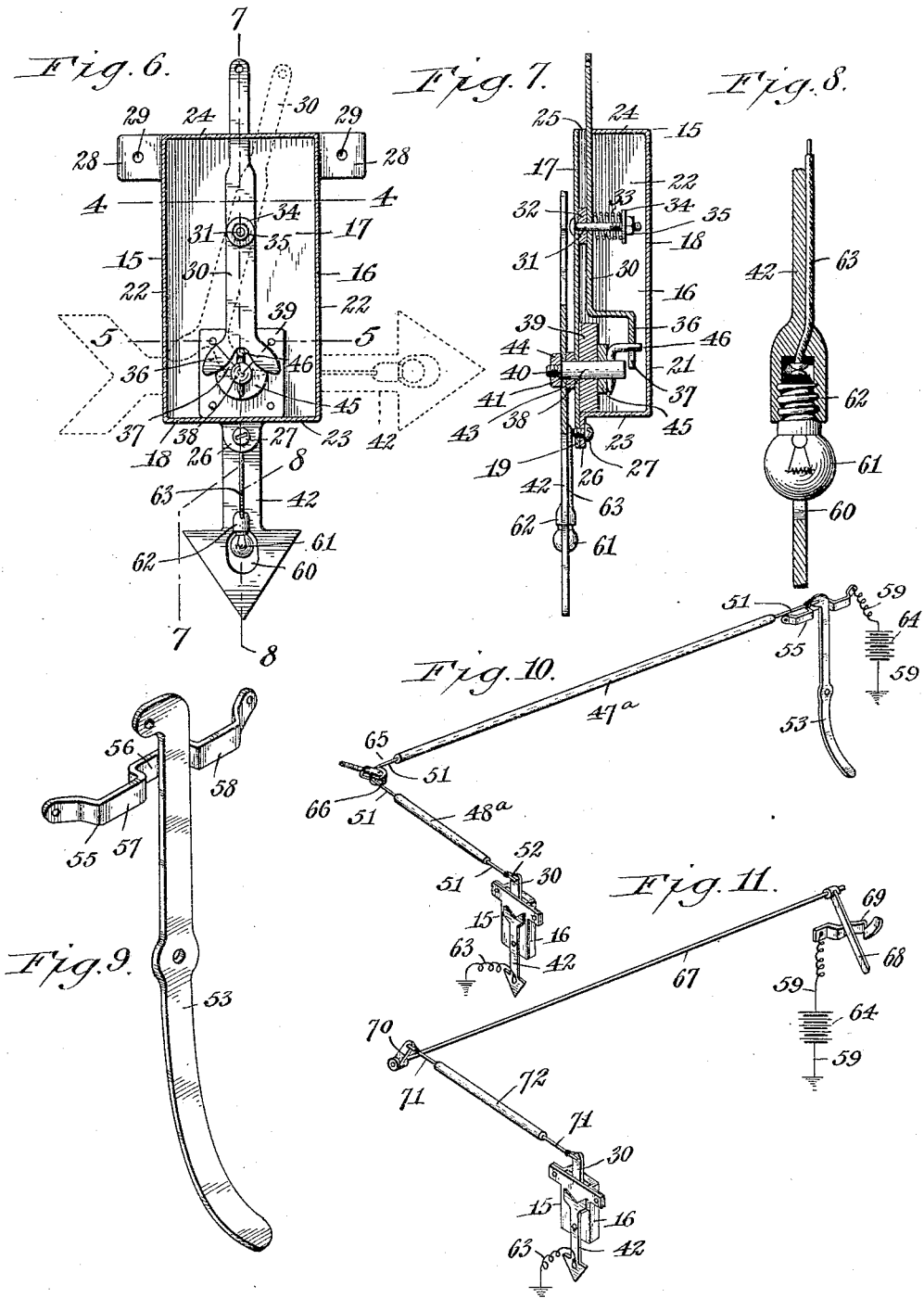

Patented June 27, 1933

1,915,505

UNITED STATES PATENT OFFICE

FREDERICK M. WALZ AND CHARLES J. WALZ, OF BUFFALO, NEW YORK

VEHICLE SIGNAL

Application filed February 18, 1931. Serial No. 516,545.

Our invention relates to improvements in vehicle signals, and more particularly to direction signals for automobiles.

The object of our invention is to provide a signal which is simple, inexpensive and reliable, and preferably wholly confined within the body of a closed automobile so that the elements of the weather will not interfere with the operation of movable parts thereof.

Another object of our invention is the provision of a signal of the kind mentioned, which has its signaling element at the rear of the automobile and actuating mechanism extending forwardly therefrom to a point within convenient reach of the operator of the automobile.

A further object of our invention is the provision of a signal having a signaling element movable through a comparatively wide range, and which is combined with actuating mechanism associated with said movable signaling element but requiring comparatively little movement to cause actuation of said signaling element.

With the above and other objects in view to appear hereinafter, our invention consists in the novel features of construction and in the arrangement and combination of parts to be hereinafter described and more particularly pointed out in the subjoined claims.

In the drawings:

Fig. 1 is a longitudinal section showing a portion of an automobile and the manner of applying our invention thereto.

Fig. 2 is an enlarged fragmentary horizontal section through the automobile taken on line 2—2, Fig. 1.

Fig. 3 is a perspective view of the signaling unit and a portion of the actuating wire for actuating the signaling element of said unit.

Fig. 4 is a cross section taken on line 4—4, Fig. 6.

Fig. 5 is a cross section taken on line 5—5, Fig. 6.

Fig. 6 is a vertical section taken on line 6—6, Fig. 3.

Fig. 7 is a vertical section taken on line 7—7, Fig. 6.

Fig. 8 is an enlarged vertical section taken on line 8—8, Fig. 6.

Fig. 9 is a perspective view of the manipulating lever and the current contact-bracket associated therewith.

Figs. 10 and 11 are perspective views showing slightly modified actuating means for actuating the signaling element of the signaling unit.

Referring to the drawings in detail, the numeral 12 designates the body of an automobile of the closed type, such bodies having one or more entrance and exit doors 13 and usually a rear window 14, such as will enable the operator of the automobile to obtain a view of the road in rear by means of the usual reflector mirror placed above the windshield.

Within the automobile body, forward of and in close proximity to the rear window 14, our improved signal or signaling unit 15 is arranged. This unit comprises a casing 16 formed in any practicable manner and having parts of the signaling mechanism arranged therein, part extending outwardly therefrom, and part applied to the exterior thereof, preferably the rear of the casing.

We preferably form the casing 16 by providing a flat back plate 17 and a chambered cover 18. The flat back plate may be considered the support and it has a depending ear 19 at its lower end and laterally-extending ears 20 at its extreme upper end. The chambered cover 18 has a front wall 21, side walls 22, a bottom wall 23, and a top wall 24, the latter being cut away along its rear marginal portion to provide an opening 25. This cover has an ear 26 extending downwardly from its bottom wall and adapted to lie in contact with the depending ear 19 of the back plate or support, and a securing screw 27 is passed through these ears to fasten the cover to the back plate or support at their lower ends. Said cover also has extending from the rear edge of the side walls, laterally-extending ears 28 which lie against the laterally-extending ears 20 of the back plate or support, and through these last-mentioned overlying ears, registering screw holes 29 are formed, through which screws or other similar securing means are passed and entered into the rear wall of the automobile body directly above the rear window 14. The major portion of the casing so formed therefore is positioned directly in front of the rear window 14 and is visible through said window from the rear of the automobile.

Fastened to the back plate or support 17 is an actuating lever 30, preferably vertically disposed; it being pivotally mounted on a screw or other pivot element 31 passed through said back plate or support and spaced from the latter by a washer or other spacing element 32 so as to avoid rubbing contact with said back plate; thus assuring free action for said lever.

Surrounding said pivot element is a spring 33, bearing at one end against the front face of said actuating lever and at its other end against a washer 34 against which a nut 35 threaded onto said pivot element bears. By adjusting this nut on said pivot element the tension of the spring 33 may be varied; its purpose being to apply pressure to the actuating lever so as to hold the same in any position into which it may be moved.

The actuating lever 30 extends upwardly through the opening 25 in the casing, and its lower end is bent forwardly and thence downwardly to form an offset terminal 36 which is widened, as shown in Fig. 6, and provided with a substantially V-shaped notch 37 opening downwardly; the side walls of this notch being preferably curved lengthwise to form cam edges or faces. The lower end or terminal of the actuating lever may therefore be said to be formed to serve as an actuator cam.

Arranged for rotatable oscillation in the back plate or support 17 is a short shaft or spindle 38 which, due to its movement, may be termed a rock shaft or spindle. Since it is our intention to construct the casing of sheet metal, we deem it advisable to provide a longer bearing for said rock shaft or spindle than would be formed by the sheet metal, and with this end in view a comparatively thick bearing block 39, preferably metal, is secured to the front face of the back plate or support 17; it being riveted or otherwise fastened to said back plate or support. The rock shaft or spindle 38 extends rearwardly through the back plate and also forwardly into the casing beyond the front face of the bearing block 39, the rear end thereof being reduced in diameter, as at 40, and screw-threaded to provide a shoulder 41.

Mounted on the rear projecting end of said rock-shaft or spindle is a signaling arm or element 42, preferably in the form of an arrow having a normally depending position with the point of the arrow directed downwardly, and between this signaling element and the rear face of the back plate or support 17 is a washer or other spacing element 43 to hold the signaling element out of contact with said back plate and prevent rubbing action during the actuation of said signaling element.

The rear face of this signaling element is flush with the shoulder 41 on said rock shaft or spindle, and a nut 44 is applied to the threaded reduced end of said shaft or spindle and bears against said shoulder and against the rear face of the signaling element.

Positioned on the forwardly-extending end of said rock shaft or spindle is a washer 45, and passed through said shaft or spindle is a cam pin 46, the upper end of which is directed forwardly over the front end of the rock shaft or spindle and projects beyond the end face of the latter. This pin serves the double function of a cam member and a retainer to retain the rock shaft or spindle in proper position within its bearing. The forwardly-projecting portion of said pin extends through the V-shaped notch in the cam end of the actuating lever 30 and is adapted to be engaged by the side walls of said notch, which, as stated, serve as cam edges or faces, and may therefore be termed a double-action cam.

As clearly shown in Fig. 7, the cam end or terminal of the actuating lever 30 is disposed in a plane forward of the front end of the rock shaft or spindle 38, and therefore when moving said actuating lever, one of the side walls or cam faces of the notch in the latter comes in contact with the forwardly-projecting or cam portion of the pin 46, and under pressure applied by said lever said pin is caused to swing in a circular course having the axis of said rock shaft or spindle as its center, with the result that said shaft or spindle is caused to rock, and the signaling element or arrow secured to the rear end thereof is swung through an arc of a circle.

Arranged in the angles or corners formed by the top and one of the sides and the top and the rear wall is a guide or retainer tube 47. This tube is stapled to said walls or otherwise fastened in place and has a longitudinal side member 48 and a transverse rear member 49 connected together by a curved portion 50. Passing through this guide or retainer member is a combined actuating and current-conducting wire 51 capable of moving freely through the tube. This wire is rigid enough to move within the tube under pulling or pushing force, yet is flexible enough to conform to the curved portion of said tube and move freely through said portion. This wire extends from the rear and front ends of said tube and its rear terminal is connected to the upper end of the actuating lever 30, as at 52. The front terminal of this actuating wire is connected to the upper end of a manipulating lever 53 pivotally secured between its ends, as at 54, preferably to the upright between the front and rear doors at one side of the car. It, however, is to be understood that this manipulating lever may be elsewhere located within convenient reach of the operator of the automobile. This manipulating lever is adapted to co-act with a switch bracket 55 secured to the side of the car and having a depressed portion or recession 56 between its ends forming opposite contact portions 57, 58 between which said depressed portion or recession is arranged. The manipulating lever is normally disposed in line with said depressed portion or recession and is out of contact with the switch bracket. This bracket has connected thereto a current-conducting wire 59.

The signaling element or arrow 42 may have an opening 60 formed in its head, or otherwise, in which an incandescent electric lamp 61 is arranged; said lamp being threaded into a socket 62 formed in said signaling element or arrow and having connection with a current-conducting wire 63. The wires 59 and 63 may be grounded and either of said wires, for example as shown in Fig. 1, wire 59, may have opposite poles of a battery 64 connected therewith.

A hand-operated switch (not shown) may be used in the circuit so or otherwise formed, with a view of cutting out the lamp 61 during day driving.

Assuming the signaling element or arrow to be in a depending or downwardly pointing position when driving along a straight course, and it is desired to drive the automobile to the left, it is simply necessary to move the lower or handle end of the manipulating lever 53 in a rearward direction. This moves the upper portion of said lever forwardly and pulls the combined actuating and current-conducting wire 51 forwardly within the guide or retainer tube 47. This results in movement of the actuating lever 30 from the position shown in full lines in Fig. 6 to that shown in dotted lines; thereby causing the right hand portion of the cam terminal, as shown in said figure, to engage the cam pin 46 and move said pin through an arc of a circle from the position shown in full lines to that shown in dotted lines, the cam edge or wall engaging said pin being retained in contact therewith. This therefore causes the rock shaft or spindle 38 to move through a quarter of a complete revolution, with the result that the signaling element or arrow is swung from the position shown in full lines in said figure to that shown in dotted lines. Others in rear of the automobile are thereby informed that a left-hand turn is to be made. During such manipulation, the upper end of the manipulating lever 53 is brought into engagement with the contact portion 58 of the switch bracket 55 and, assuming the circuit switch, referred to and not shown, is closed, the current will be conducted from the switch bracket 55 through the manipulating lever 53, the actuating wire 51, the actuating lever 30, the cam pin 46, rock shaft 38 and signaling element 42 to the electric lamp 61; the current being grounded from said lamp through wire 63. From the battery 64 the current is also grounded and current is also conveyed therefrom to the switch bracket 55; thus completing the electric circuit and illuminating the electric lamp 61.

In the event that a right-hand turn is to be made, the manipulating lever 53 is swung in the opposite direction to bring the upper end thereof into engagement with the contact portion 57 of the switch bracket 55, thus establishing a circuit in the manner described. In order, however, to manipulate the signaling element so as to indicate such right hand turn, such manipulation of the lever 53 causes movement of its upper end in a rearward direction and exerts force against the actuating and current-conducting wire 51 in a rearward direction. The wire 51 is thus moved under pushing action and swings the actuating lever 30 of the signaling unit in an opposite direction, swinging the signaling element or arrow in a direction opposite that shown in dotted lines in Fig. 6.

In the preferred construction we have show a continuous guide or retainer tube, in which the longitudinal section 48 is connected with the transverse section 49 by a curved portion 50. This arrangement is usable only in automobiles in which the rear vertical corners or angles of the car body are curved on a comparatively large radius, since a tube having a curve on a small radius or a sharp bend, will not permit free movement of the actuating wire therethrough. Therefore, where automobile bodies are provided with sharp rear vertical corners, we form the guide or retainer tube in two separated sections 47$^a$, 48$^a$, adjacent ends of which are spaced apart, as at 65, and into the corner of the automobile between the adjacent ends of the two sections of guide or retainer tubes, a pulley 66 is arranged, the actuating wire 51 being exposed between adjacent ends of said tubes and passed around said pulley, as clearly shown in Fig. 10.

A further modification of our invention is shown in Fig. 11 wherein a rock shaft 67 is suitably journaled along a side wall of the automobile above the door openings, suitable journal brackets (not shown) being fastened to the side wall. At the front end of this rock shaft a manipulating lever 68 is secured which is adapted to co-operate with a modified form of switch bracket 69. The movement of this lever is toward and away from the side wall, in contradistinction to a movement parallel therewith, as provided in our preferred construction, and consequently the bracket is disposed at a right angle to said side wall. Normally this lever is out of contact with the bracket and is adapted, upon movement, to engage one or the other of the two contact portions thereof, in a manner hereinbefore explained. At the rear end of this rock shaft 67, a lever 70 is arranged to which one end of an actuating wire 71 is secured, the other end of said wire being fastened to the upper end of the actuating lever 30 forming part of our signaling unit. Upon rocking said shaft 67, the wire 71 is pulled or pushed and causes the desired manipulation of the signaling element or arrow 42. In order to prevent buckling of this wire when actuated under pushing strain, a guide or retainer tube 72 is secured in any suitable manner to the rear wall of the automobile body. These several parts may, or may not, be used as current-conducting elements.

While we have referred to the notch in the actuating lever as an upwardly-tapering or inwardly-tapering notch, it may also be referred to as a downwardly-flaring notch and, in preferred form, the actuating lever 30 is vertically disposed while the rock shaft or spindle 38 is horizontally disposed, or at right angles to said actuating lever; and it may be stated that the signaling element or arrow may be firmly pressed onto the rock shaft, or otherwise secured thereto so as to cause it to move therewith and, in a generic sense, the right angled or forwardly-extending portion of the cam pin 46 may be termed a projection of, or a projection on the rock shaft 38 disposed parallel with the axis of the latter.

Having thus described our invention, what we claim is:

1. A signal, comprising a support, an actuating lever pivotally secured to said support and having a notch in one end, a rock shaft disposed at right angles to said lever and having a projection thereon parallel with its axis and arranged off center thereof, said projection, extending beyond the end of said shaft and being entered in said notch and engaged by the walls of said notch to rock said shaft in one or the other direction while allowing the actuating lever to move in front of said shaft, and a signaling element secured to said shaft.

2. An automobile signal, comprising a support, an actuating lever pivotally mounted on said support and normally vertically disposed, said actuating lever having a cam portion thereon; a rock shaft mounted in said support and disposed at a right angle to said lever, a projection, arranged off center on said rock shaft and extending beyond the end thereof and engaged by said cam portion for rocking said shaft, said projection allowing said actuating lever to move across the end of said shaft, and a signaling element secured to said shaft.

3. A signal, comprising a back plate adapted to be secured to an automobile or other object, a cover applied to said back plate and forming a chamber, said cover having an opening in one of its walls, an actuating lever pivotally secured between its ends to said back plate and being spaced from the latter, said lever having one end projecting through the opening in said cover and its other end widened and offset and provided with an inwardly-tapering notch having convex walls, said widened end being disposed within said chamber, a rock shaft journaled in said back plate and extending into said chamber and also through said back plate, a pin passed through said shaft and having a portion bent at right angles parallel with said shaft, said right-angled portion extending into the notch of said actuating lever forward of said shaft, means between said pin and said back plate to prevent outward movement of said shaft, a spacing element on said shaft lying against the outer side of said back plate, a signaling element on said shaft bearing against said spacing element, and a nut applied to said shaft and bearing against said signaling element.

4. An automobile signal, comprising a back plate and a cover applied to said back plate and having a front wall, side walls, a top wall, and a bottom wall, one of said walls having an opening therethrough, means to fasten the cover to said back plate, a vertically-disposed actuating lever pivotally secured between its ends to said back plate and projecting through said opening, one end of said actuating lever being provided with a notch having convex side walls, a shaft journaled in said back plate and having an off-center projection parallel with its axis extending forwardly beyond the front end thereof to permit said actuating lever to move across the end of said shaft, said projection being entered in said notch, and a signaling arrow secured to said shaft outside of said chamber.

In testimony whereof, we affix our signatures.

FREDERICK M. WALZ.
CHARLES J. WALZ.